United States Patent
Reinstaedt

(10) Patent No.: US 10,948,563 B2
(45) Date of Patent: Mar. 16, 2021

(54) RADAR ENABLED LOCATION BASED KEYWORD ACTIVATION FOR VOICE ASSISTANTS

(71) Applicant: Infineon Technologies AG, Neubiberg (DE)

(72) Inventor: Jens Reinstaedt, Munich (DE)

(73) Assignee: INFINEON TECHNOLOGIES AG, Neubiberg (DE)

(*) Notice: Subject to any disclaimer, the term of this patent is extended or adjusted under 35 U.S.C. 154(b) by 351 days.

(21) Appl. No.: 15/936,922

(22) Filed: Mar. 27, 2018

(65) Prior Publication Data

US 2019/0302219 A1    Oct. 3, 2019

(51) Int. Cl.

| | | |
|---|---|---|
| *G01S 3/80* | (2006.01) | |
| *G01S 13/86* | (2006.01) | |
| *G01S 13/56* | (2006.01) | |
| *G06F 16/242* | (2019.01) | |
| *G06F 3/16* | (2006.01) | |
| *G10L 15/22* | (2006.01) | |
| *G10L 21/0216* | (2013.01) | |
| *G10L 15/08* | (2006.01) | |

(52) U.S. Cl.
CPC .............. *G01S 3/80* (2013.01); *G01S 13/56* (2013.01); *G01S 13/86* (2013.01); *G06F 3/167* (2013.01); *G06F 16/243* (2019.01); *G10L 15/22* (2013.01); *G10L 2015/088* (2013.01); *G10L 2021/02166* (2013.01)

(58) Field of Classification Search
CPC . G01S 3/80; G01S 13/86; G01S 13/56; G01S 13/06; G10L 2021/02166; G10L 2015/088; G10L 15/22; G10L 17/24; G10L 2015/223; G06F 16/243; G06F 3/167; G01H 17/00
See application file for complete search history.

(56) References Cited

U.S. PATENT DOCUMENTS

| | | | | |
|---|---|---|---|---|
| 4,945,360 | A * | 7/1990 | Trummer | G01S 7/35 342/122 |
| 8,938,394 | B1 * | 1/2015 | Faaborg | G10L 15/22 704/275 |
| 2009/0055180 | A1 * | 2/2009 | Coon | B60R 16/0373 704/251 |
| 2015/0009064 | A1 * | 1/2015 | Waldschmidt | G01S 7/4021 342/175 |
| 2017/0243578 | A1 * | 8/2017 | Son | G10L 21/0232 |
| 2019/0302219 | A1 * | 10/2019 | Reinstaedt | G01S 3/80 |
| 2019/0302253 | A1 * | 10/2019 | Santra | G01S 13/64 |

FOREIGN PATENT DOCUMENTS

| | | | | |
|---|---|---|---|---|
| CN | 110310649 A | * | 10/2019 | ............. G01S 13/86 |
| EP | 3067884 A1 | | 9/2016 | |
| EP | 3547309 A1 | * | 10/2019 | ............. G01S 3/80 |
| WO | 2015106134 A1 | | 7/2015 | |

* cited by examiner

*Primary Examiner* — Daniel Pihulic
(74) *Attorney, Agent, or Firm* — Slater Matsil, LLP

(57) ABSTRACT

A method of operation for a voice assistant includes detecting the presence of a person and sound in a general location, detecting whether the person is in a specific location of the general location, and if the person is in the specific location, initiating operation of the voice assistant with a predefined specific command other than a global keyword.

20 Claims, 10 Drawing Sheets

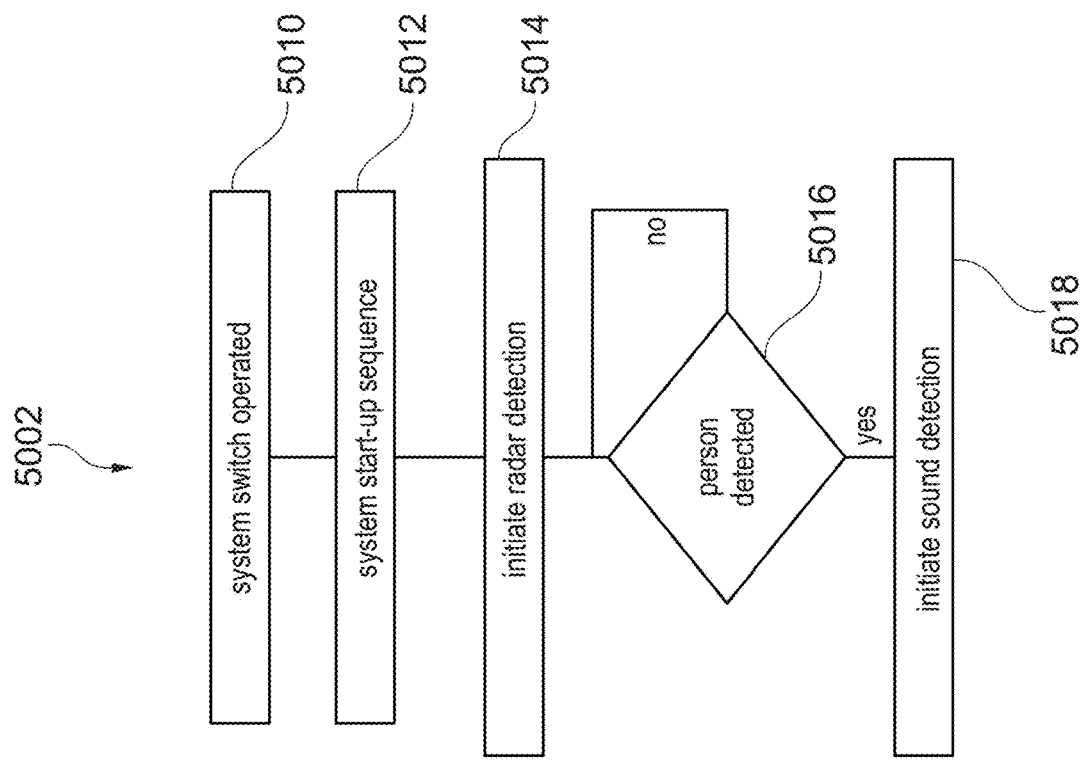
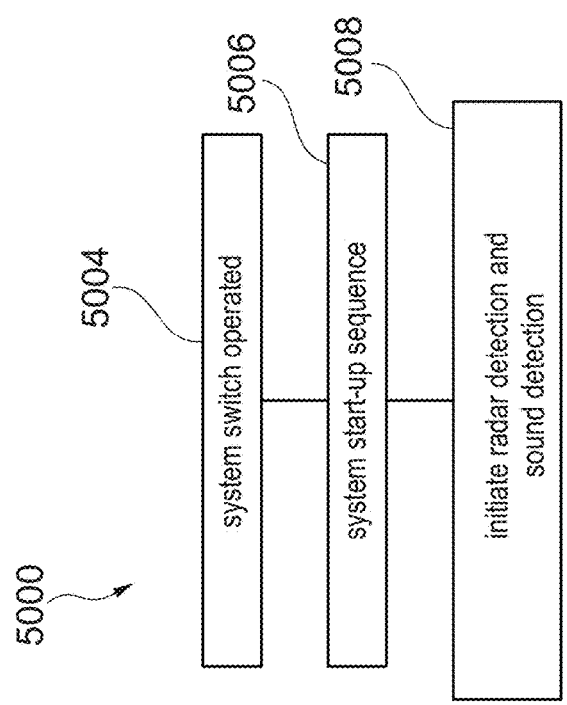
Fig. 5A
Fig. 5B

US 10,948,563 B2

RADAR ENABLED LOCATION BASED KEYWORD ACTIVATION FOR VOICE ASSISTANTS

TECHNICAL FIELD

The present invention relates generally to a system and method for radar enabled location based keyword activation for voice assistants.

BACKGROUND

Voice assistants interact with a user's voice commands to create calendar entries, create shopping lists, provide requested information, and to perform numerous other tasks such as activating smart appliances or playing music. However, voice assistants typically only process a user's voice commands after the receipt of a predefined wakeup keyword. Although the use of a predefined wakeup keyword is an effective approach for ensuring that a command is actually being given by the user, what is desired by some users is to eliminate the use of a spoken keyword in order to enable a more natural conversation and interaction with the voice assistant.

SUMMARY

An embodiment method of operation for a voice assistant includes detecting the presence of a person and sound in a general location, detecting whether the person is in a specific location of the general location, and if the person is in the specific location, initiating operation of the voice assistant with a predefined specific command other than a global keyword.

A corresponding system for implementing the embodiment method includes a radar MMIC coupled to a microphone array coupled together with a microprocessor in communication with the voice assistant. In an embodiment, the radar MMIC is a FMCW radar MMIC and is coupled to an oscillator.

BRIEF DESCRIPTION OF THE DRAWINGS

For a more complete understanding of the present invention, and the advantages thereof, reference is now made to the following descriptions taken in conjunction with the accompanying drawings, in which:

FIGS. 5A and 5B show flow charts of embodiment methods for start-up processing of a voice assistant;

DETAILED DESCRIPTION OF ILLUSTRATIVE EMBODIMENTS

Figure 1:
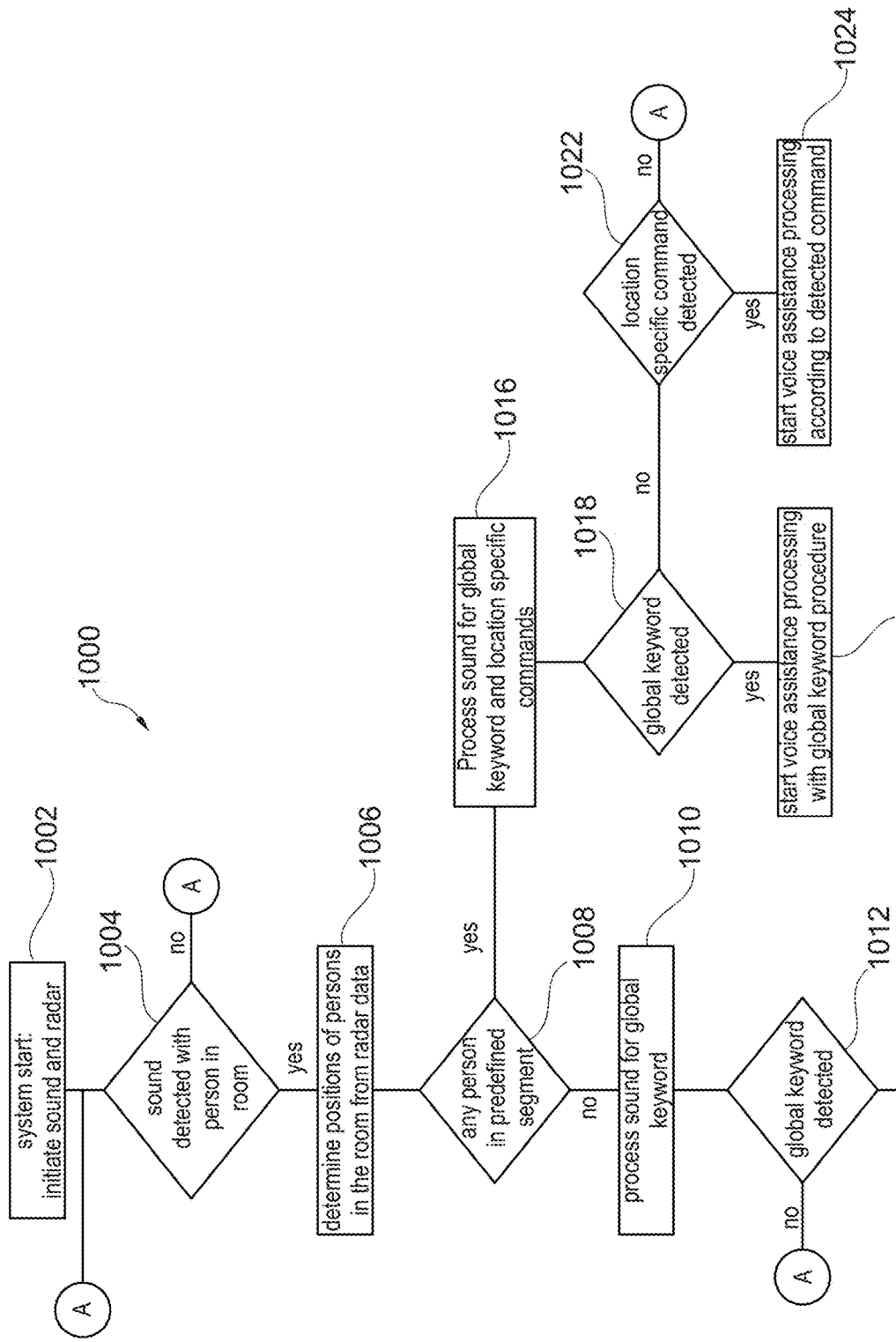
FIGS. 1-4 show flow charts of embodiment methods for interacting with a voice assistant.

A flow chart 1000 of an embodiment method is shown in FIG. 1. A system for performing the embodiment method (the system is explained in further detail below with respect to FIG. 9) is initiated, including sound detection and radar portions at step 1002. The system being successfully initiated is designated in the flow chart 1000 by a capital "A" in a circle as is shown in FIG. 1. Step 1004 interrogates whether sound is detected, with a person being present in the room. If no, the method returns to initiation location "A". If yes, then the method advances to step 1006. At step 1006, the positions of the various people in the room are determined from the radar data, and the method advances to step 1008. Step 1008 interrogates whether any detected person is in a predefined segment of the room. If yes, the method proceeds to step 1016, which is described in further detail below. If no, the method proceeds to step 1010, wherein sounds in the room are processed for the presence of a global keyword. Step 1012 interrogates whether or not the global keyword is detected in the processed sound. In no, the method returns to initiation location "A". If yes, then the voice assistant begins normal processing using a global keyword procedure at step 1014. Returning to step 1016, the sound in the room is processed for a global keyword and location specific commands. Step 1018 interrogates whether or not a global keyword has been detected in the processed sound. If yes, then the voice assistant begins normal processing using a global keyword procedure at step 1020. If no, the method continues to step 1022, which interrogates whether or not a location specific command is detected. If no, the method returns to initiation location "A". If yes, then the voice assistant begins processing using the detected specific command at step 1024.

Figure 2:
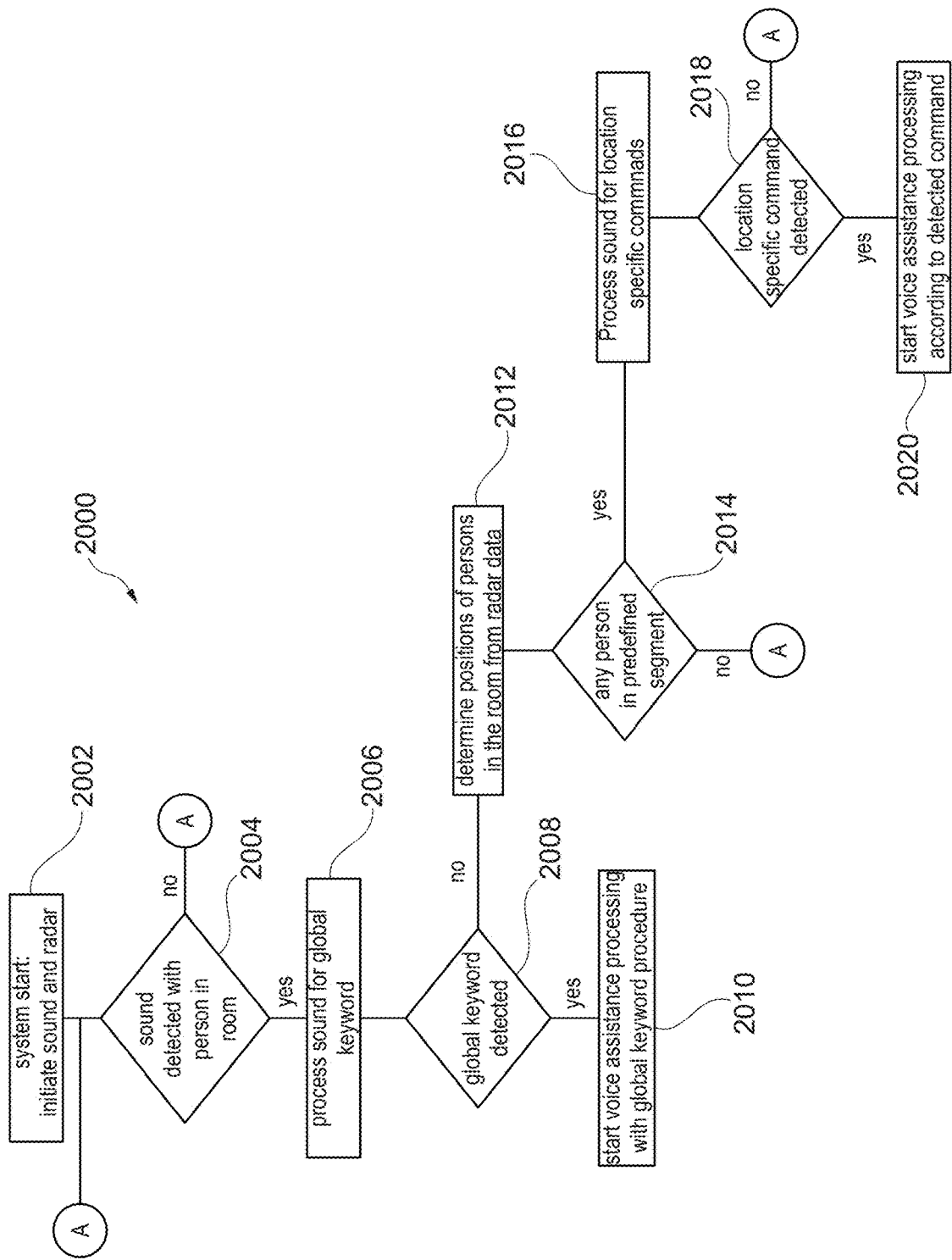

A flow chart 2000 of an embodiment method is shown in FIG. 2, wherein the sound in the room is processed for the global key word before determining if any person is in a predefined segment. The system for performing the embodiment method is initiated, including sound detection and radar portions at step 2002. Step 2004 interrogates whether sound is detected, with a person being present in the room. If no, the method returns to initiation location "A". If yes, then the method advances to step 2006 to process the sound in the room the presence of the global keyword. Step 2008 interrogates whether or not the global keyword is detected. If yes, the method proceeds to step 2010, wherein the voice assistant begins processing using the normal global keyword procedure. In no, then the positions of the persons in the room are determined from radar data at step 2012. The method then proceeds to step 2014, which interrogates whether are not any of the persons in the room are in a predefined segment. If no, then the method returns to initiation location "A". If yes, then the method continues to step 2016 where the sound in the room is processed for location specific commands. The method then proceeds to step 2018, which interrogates whether or not a location specific command is detected. If no, then the method returns to initiation location "A". If yes, then the voice assistant begins processing using the detected specific command at step 2020.

Figure 3:
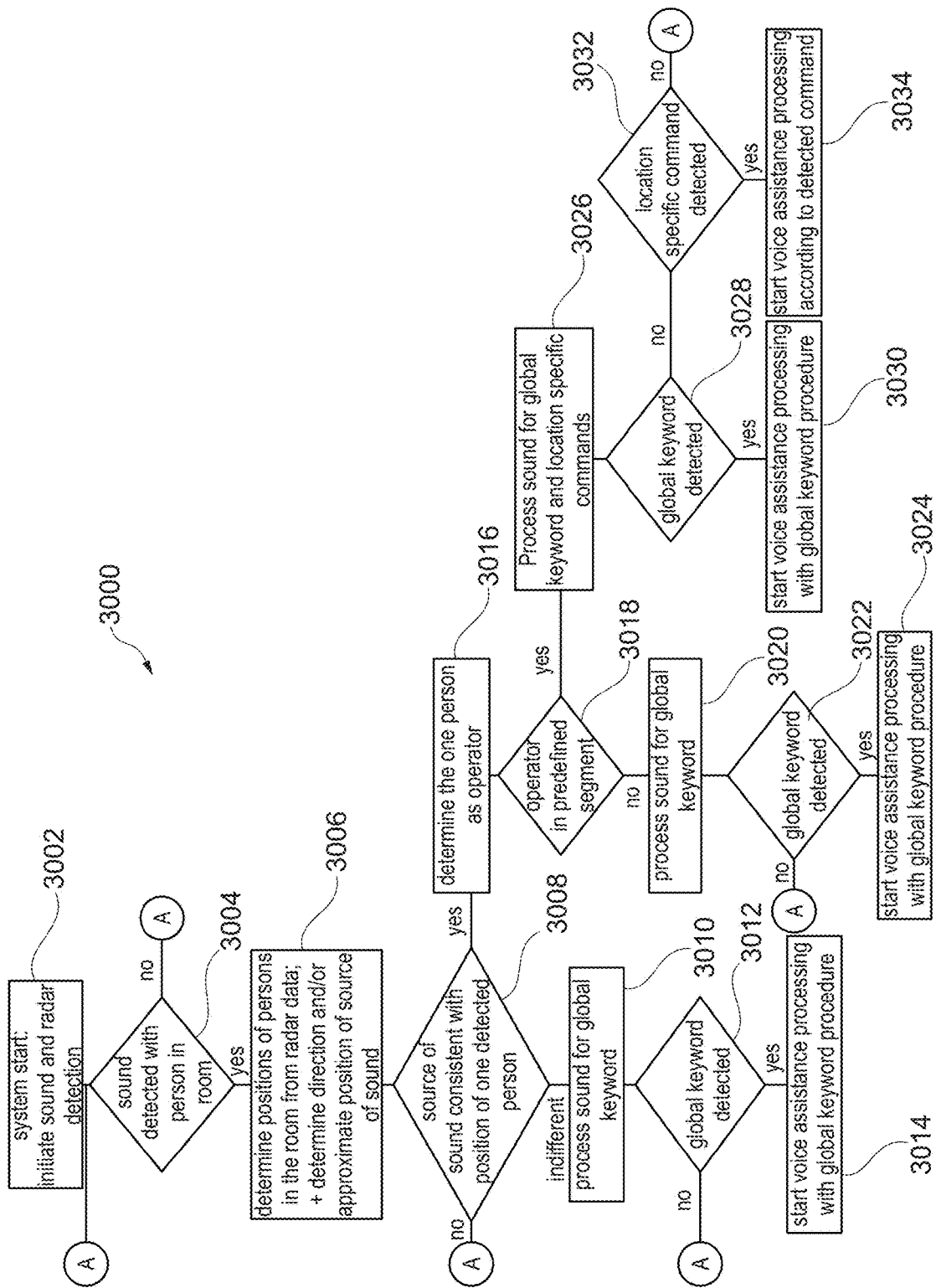

A flow chart 3000 of an embodiment method is shown in FIG. 3, wherein the positions of the persons in the room are determined before processing the sound for the presence of the global keyword. The system for performing the embodiment method is initiated, including sound detection and radar portions at step 3002. Step 3004 interrogates whether sound is detected with a person being in the room. If no, the method returns to initiation location "A". If yes, the method continues to step 3006, which determines the positions of persons in the room from radar data, and determines the direction and/or approximate position of the source of the sound using the beamforming microphone array 9008 best shown in FIG. 9. Step 3008 interrogates whether or not the source of the sound is consistent with the position of one of the detected persons. If no, then the method returns to initiation location "A". If "indifferent" (meaning the direction of the sound is inconsistent with the position of the detected person, but operation of the voice assistant will still be allowed with the global keyword in a mode of operation) then the sound in the room is processed for presence of the global keyword at step 3010. Step 3012 interrogates whether or not the global keyword is detected in the processed sound. If no, then the method returns to initiation location "A". If yes, the voice assistant begins processing using the normal global keyword procedure at step 3014. Returning now, to step 3008, if the source of the sound is consistent with the position of one of the detected persons, then the detected person is designated as an operator at step 3016. Step 3018 interrogates whether or not the operator is in a predefined step. If no, the sound in the room is processed for the global keyword at step 3020. Step 3022 interrogates whether or not the global keyword is detected. If no, the method returns to initiation location "A". If yes, the voice assistant begins processing with the normal global keyword procedure at step 3024. Returning now to step 3018, if the operator is in a predefined segment, then the sound in the room is processed for the global keyword and location specific commands at step 3026. Step 3028 interrogates whether or not the global keyword is detected. If no, the voice assistant uses the global keyword procedure at step 3030. If no, then step 3032 interrogates whether or not the location specific command is detected. If no, then the method returns to initiation location "A". If yes, then the voice assistant begins processing according to the detected specific command at step 3034.

Figure 4:
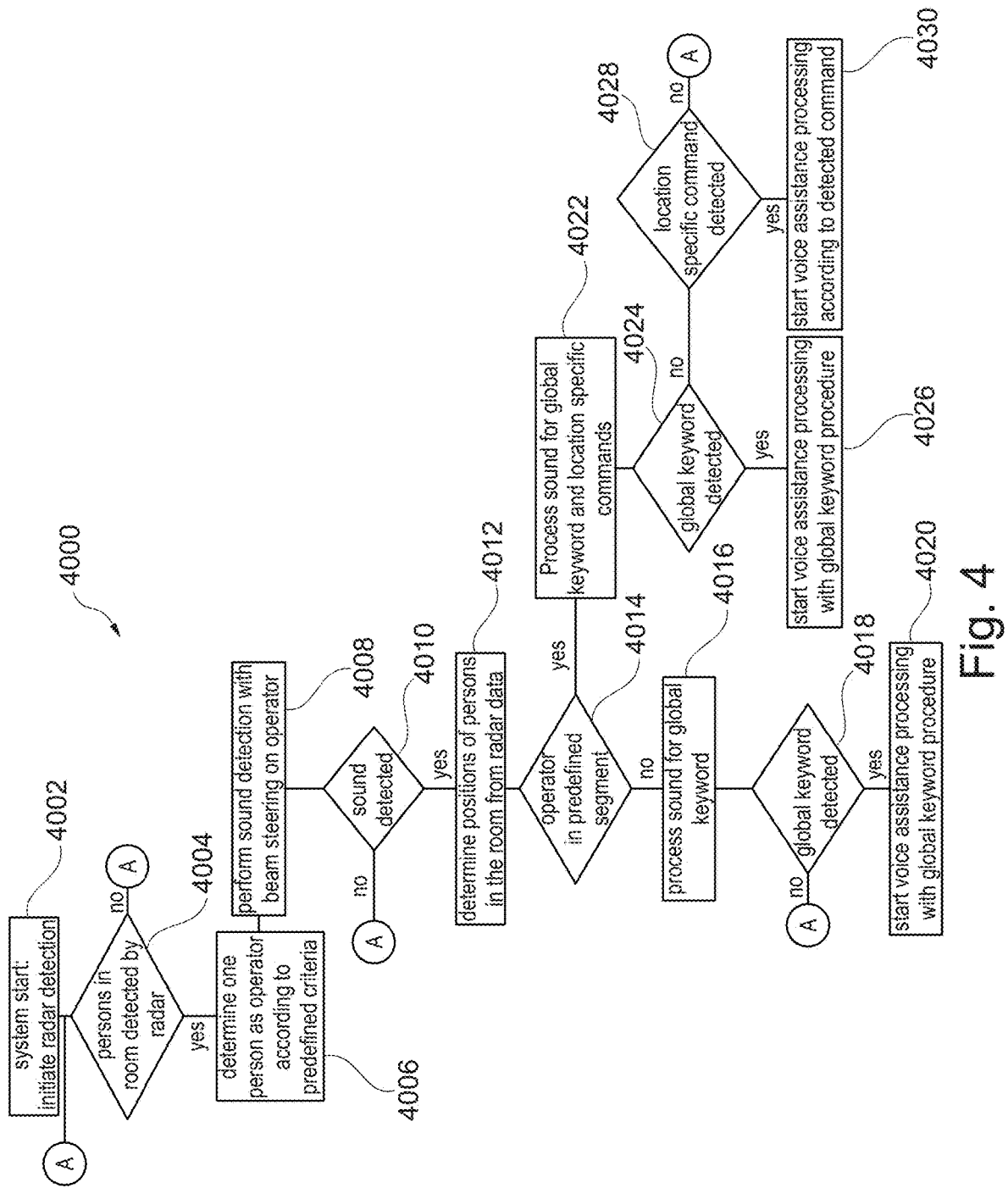

A flow chart 4000 of another embodiment method is shown in FIG. 4, wherein the positions of the persons in the room are determined before processing the sound for the presence of the global keyword. The system for performing the embodiment method is initiated, including sound detection and radar portions at step 4002. Step 4004 interrogates whether sound is detected with a person being in the room. If no, the method returns to initiation location "A". If yes, the method continues to step, which determines that one person is an operator according to predefined criteria, which is discussed in further detail below. Step 4008 performs sound detection with beam steering on the operator. Step 4010 interrogates whether or not sound has been detected. If no, the method returns to initiation location "A". If yes, the positions of persons in the room are determined at step 4012. Step 4014 then interrogates whether or not the operator is in the predefined segment. If no, then the sound is processed for the presence of the global keyword at step 4016. Step 4018 interrogates whether or not the global keyword has been detected. If no, the method returns to initiation location "A". If yes, then the voice assistant begins processing with the global keyword procedure at step 4020. Returning now to step 4014, if the operator is in a predefined segment, then the sound is processed for the global keyword and location specific commands at step 4022. If the global keyword is detected at step 4024, then the voice assistant begins processing with the global keyword at step 4026. If not, then the presence of the location specific command is detected at step 4028. If no, then the method returns to initiation location "A". If yes, then the voice assistant begins processing using the detected specific command at step 4030.

In FIG. 4, determining the operator by "predefined criteria" at step 4006. The predefined criteria could include determining that the person is in a predefined location segment, or is above a certain size or height. Thus, it is possible using radar to determine the person is an adult, a child or even a pet. Therefore the method can be pre-defined to only allow adults to give instructions, in an embodiment method. Further, in the method shown in FIG. 4, "beam steering" is used in step 4008. Many types of sound beam steering are known to those in the art, and the microphone array 9008 of FIG. 9 is adapted to use one of these known sound beam steering methods, in an embodiment.

Two startup sequences according to embodiments are shown in FIG. 5. The flow chart 5000 of a first start up sequence simply turns on the system at step 5004, starts up the system at step 5006, and then initiates the radar detection and sound detection portions without the presence or not of any radar or sound data. The flow chart 5002 of a second start up sequence turns on the system at step 5010, starts up the system at step 5012, and then initiates the radar detection at step 5014. Step 5016 then interrogates whether or not a person is in the room. If not, the method is in an idle mode until a person is actually detected. Once a person has been detected, then sound detection is initiated at step 5018. Either start up sequence can be used as preferred for a specific application.

Figure 9:
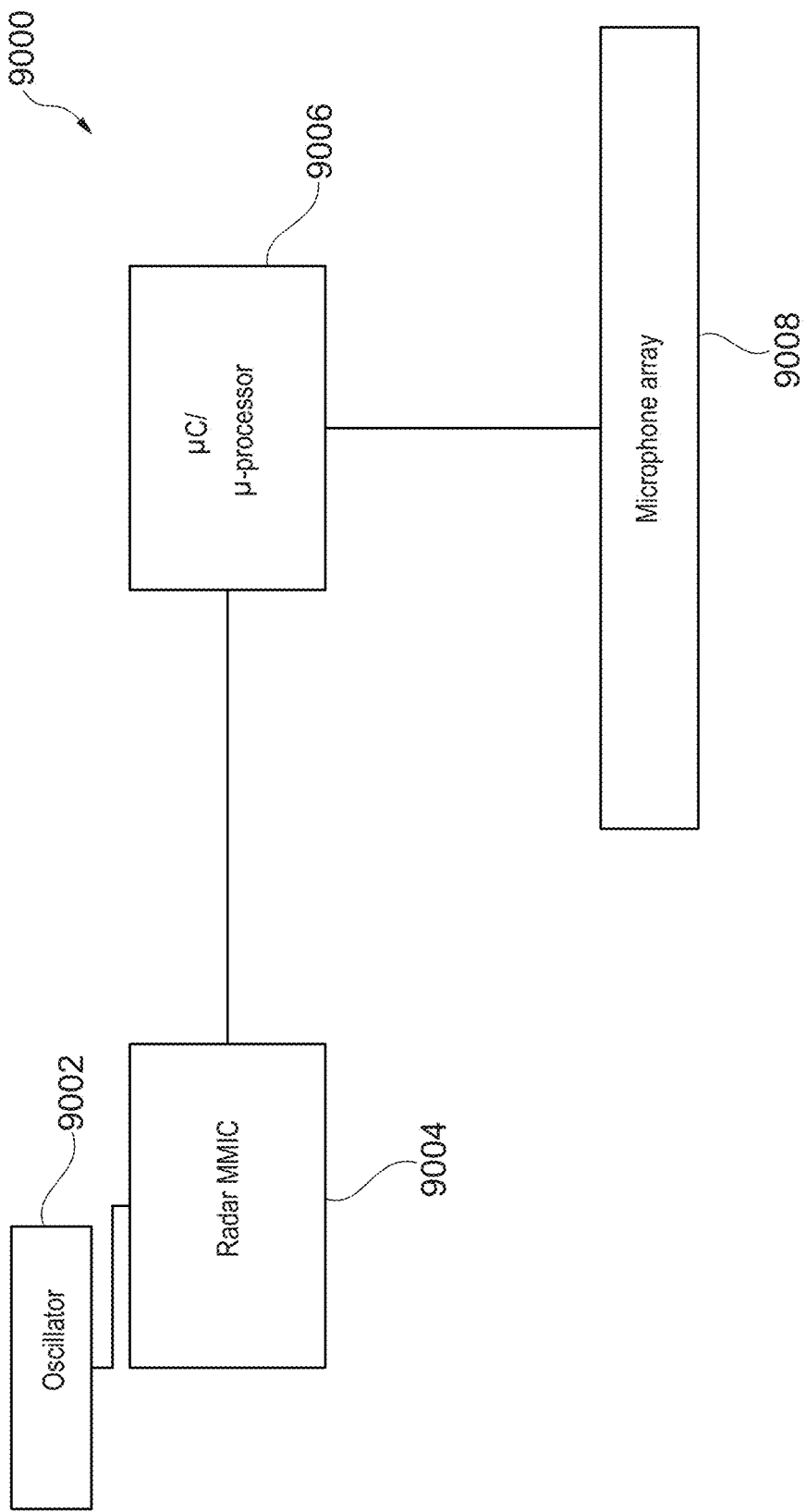
FIG. 9 shows a block diagram of an embodiment system capable of performing embodiment methods for interacting with a voice assistant.

The radar system according to embodiments (implemented as a radar Monolithic Microwave Integrated Circuit ("MMIC")) 9004 shown in FIG. 9) can detect a person and her location by combining presence detection as well as distance measurement and angle of arrival measurement using the range Doppler methodology. Radar is capable of detecting slight movements even up to a person's heartbeat. If the system does not recognize a person using this technique, voice is not picked up, in an embodiment. The user can configure the system to react to user specific key words if she is in a specific location (+/−5 degrees and +/−50 cm for flexibility). The radar system can therefore divide a room into segments. The system can learn automatically if a user uses a specific functionality on a regular basis in a specific location. If this happens, the system proposes the user that this functionality could now be applied without her mentioning the global keyword.

Figure 10:
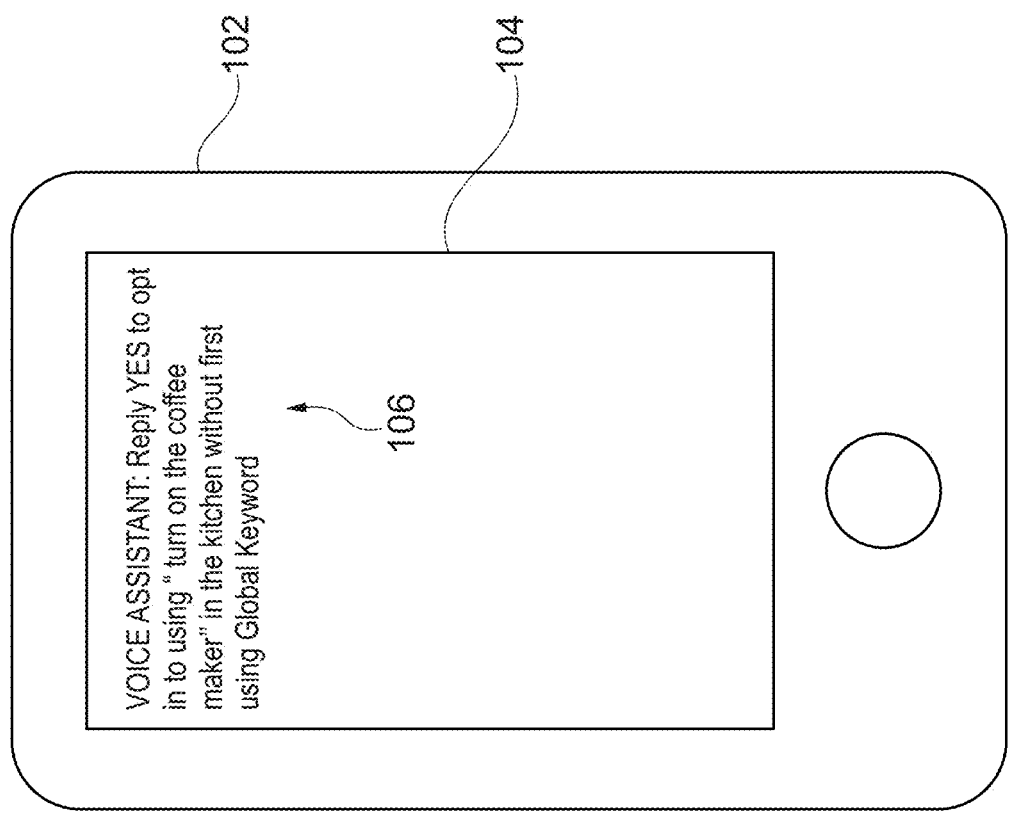
FIG. 10 shows a smart phone receiving an "opt in" request for allowing the use of a specific command based on a user's repeated use of the specific command and in a specific location.

For example, in an embodiment the number of instances of a "turn on the coffee maker" command is given in a specific location (for example, a location including the coffee maker) could be counted by the system. Once the number of "turn on the coffee maker" commands reaches a predefined minimum number of commands, then as is shown FIG. 10, a message 106 could be sent to the display 104 user's smartphone 102 with an "opt-in" request to use the "turn on the coffee maker" command in the specific location in the future without the first use of the global keyword.

Figure 6:
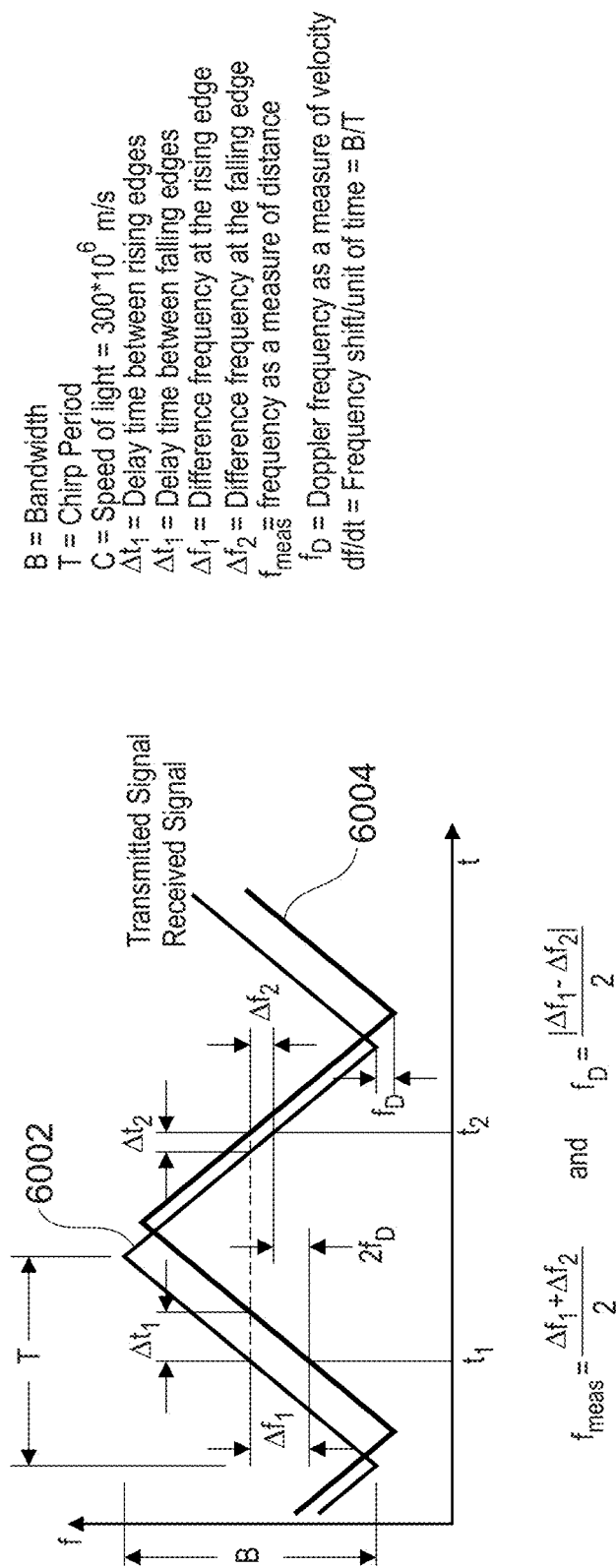
FIG. 6 shows a diagram for detection of movement using a frequency modulated continuous wave ("FMCW") radar.

The operation of the radar MMIC 9004 is described in further detail below with respect to FIG. 6. During normal operation, the radar uses frequency modulated continuous wave (FMCW) to detect the Doppler signal in order to detect presence of a person in the room. If the Doppler frequency is zero, no one is in the room and the device should not react to any voice command at all, in an embodiment. The transmitter signal 6002, and the received signal 6004, as well as the all of the pertinent constants and equations for calculating the Doppler frequency are shown in FIG. 6, including the bandwidth B, chirp period T, speed of light "c", delay time between rising edges $\Delta t_1$, delay time between falling edges $\Delta t_2$, the difference frequency at the rising edge $\Delta f_1$, the difference frequency at the falling edge $\Delta f_2 t_2$, frequency as a measure of distance $f_{meas}$, $f_D$ Doppler frequency as a measure of velocity, and df/dt frequency shift per unit of time, which is also equal to B/T. The fmeas and fD equations are also reproduced below:

$$f_{meas} = \frac{\Delta f_1 + \Delta f_2}{2} \text{ and } f_D = \frac{|\Delta f_1 - \Delta f_2|}{2}$$

Once a moving object is detected via Doppler signal, the object's distance and angle is calculated as described below.

The distance of an object is calculated using the following equation:

$$\text{Range} = R = \frac{C \times |f_{meas}|}{2 \times (df/dt)} = \frac{C \times |f_{meas}| \times T}{2 \times B}$$

The angle of an object is being calculated using the following equation:

$$\alpha = \arcsin\left(\Delta\varphi \frac{\lambda}{2\pi d}\right)$$

Figure 7:
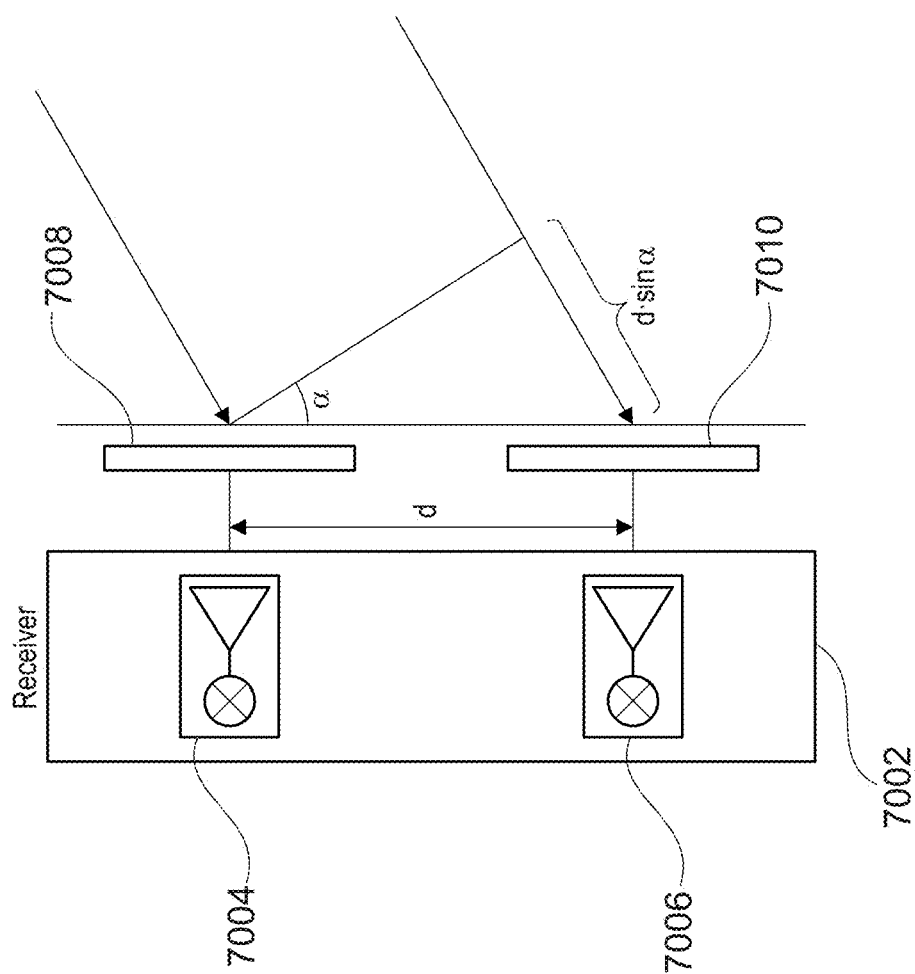
FIG. 7 shows a diagram for detecting the location of a person using the FMCW radar according to an embodiment.

FIG. 7 shows a diagram for detecting the location of a person using the FMCW radar according to an embodiment, including a receiver 7002 including a first receiver portion coupled to a first antenna 7008, and a second receiver portion coupled to a second antenna 7010. The first and second antennas 7008 and 7010 are spaced apart by the distance "d", and the angle α is shown in FIG. 7 according to the above equation.

Figure 8:
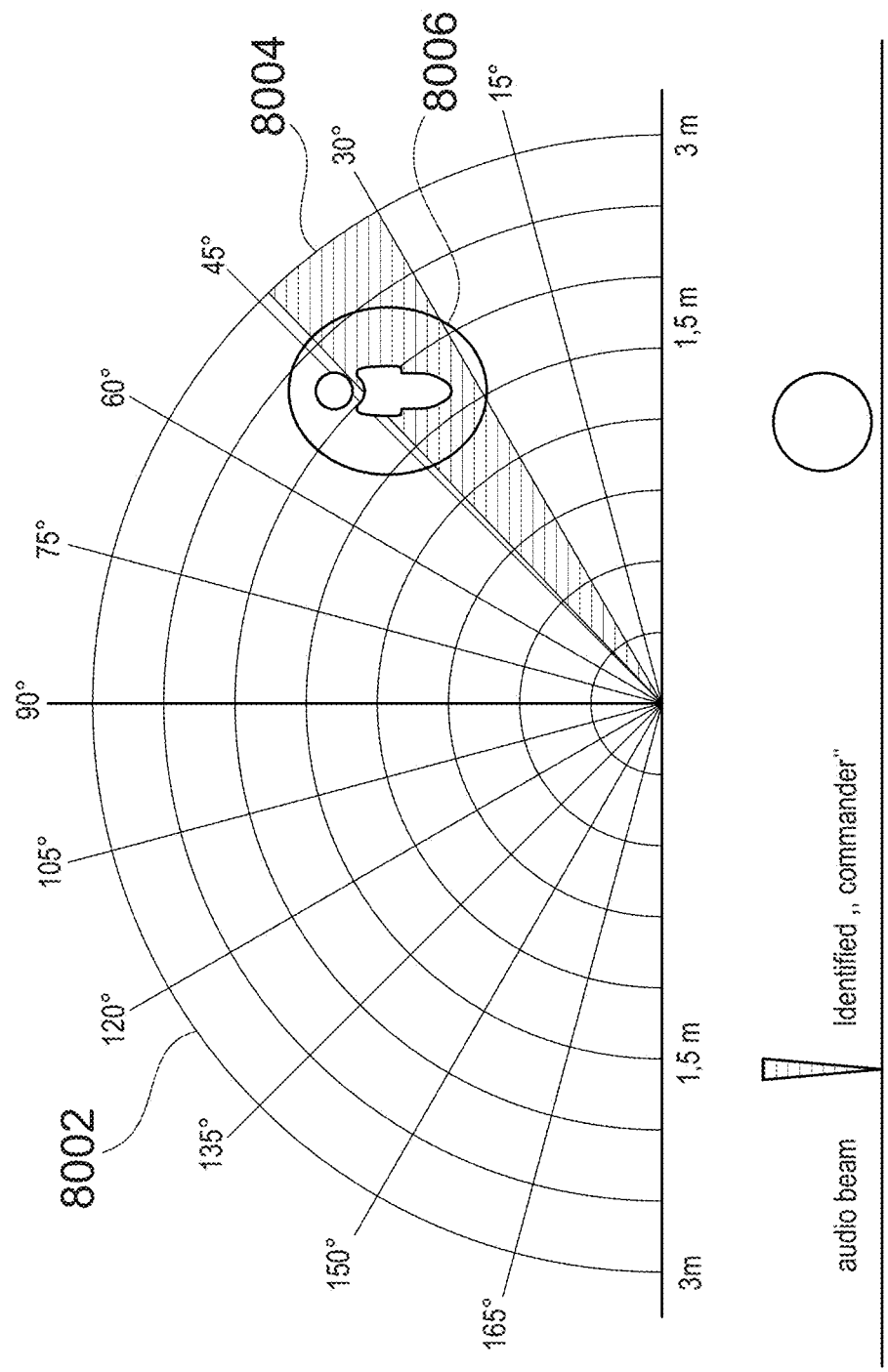
FIG. 8 shows a diagram of a person being detected in a predefined area of a room, according to an embodiment.

As is shown in FIG. 8, the user 8006 of the device has predefined areas 8006 in the room 8002 in which words or entire sentences are used as keywords for direct actions, in an embodiment. Once a (moving) object is in the predefined area (defined in terms of distance and angle away from the device) as described above, the device will be activated for the respective keyword(s), in an embodiment.

The system 9000 according to an embodiment for use with a voice assistant is shown in FIG. 9, including an oscillator 9002 coupled to a radar MMIC 9004. The radar MMIC is coupled to a microprocessor 9006, and a beam forming/finding microphone array 9008. Radar MMIC 9004 contains Tx and Rx antennas, Phase Locked Look ("PLL"), Finite State Machine ("FSM") and memory, in an embodiment. The microprocessor 9006 is coupled to the internet and/or the voice assistant in an embodiment. Other system implementations are possible including additional components as required for a specific application.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method of operation for a voice assistant comprising:
   detecting a presence of a person and sound in a general location;
   detecting whether the person is in a specific location of the general location;
   when the person is in the specific location, initiating operation of the voice assistant directly with a predefined specific command other than a global keyword; and
   when the person is not in the specific location, initiating operation of the voice assistant only with the global keyword, and executing the predefined specific command after initiating operation of the voice assistant with the global keyword.

2. The method of claim 1, wherein the predefined specific command is associated with an activity performed in the specific location.

3. The method of claim 1, wherein the predefined specific command is learned by repeated utterances of the command by a user in the specific location.

4. The method of claim 3, wherein a user can opt in to using the predefined specific command.

5. The method of claim 1, wherein the predefined specific command comprises a single word or sentence other than the global keyword.

6. A method of operation for a voice assistant comprising:
   determining positions of persons in a general location and determining a source of sound in the general location;
   determining whether the source of the sound is consistent with the position a detected person and, if the sound is consistent, designating the detected person as an operator of the voice assistant;
   determining whether the operator is in a specific location of the general location;
   when the person is in the specific location, initiating operation of the voice assistant directly with a predefined specific command other than a global keyword; and
   when the person is not in the specific location, initiating operation of the voice assistant only with the global keyword, and executing the predefined specific command after initiating operation of the voice assistant with the global keyword.

7. The method of claim 6, wherein the predefined specific command is associated with an activity performed in the specific location.

8. The method of claim 6, wherein the predefined specific command is learned by repeated utterances of the command by a user in the specific location.

9. The method of claim 8, wherein a user can opt in to using the predefined specific command.

10. The method of claim 6, wherein the predefined specific command comprises a single word or sentence other than the global keyword.

11. A method of operation for a voice assistant comprising:
    radar detecting a plurality of persons in a general location;
    determining one of the detected persons as an operator according to predefined criteria;
    performing beam steering sound detection on the operator;
    determining whether the operator is in a specific location of the general location;
    when the person is in the specific location, initiating operation of the voice assistant directly with a predefined specific command other than a global keyword; and
    when the person is not in the specific location, initiating operation of the voice assistant only with the global keyword, and executing the predefined specific command after initiating operation of the voice assistant with the global keyword.

12. The method of claim 11, wherein the predefined criteria comprises a size or height of the operator.

13. The method of claim 11, wherein the predefined criteria comprises a location of the operator.

14. The method of claim 11, wherein the beam steering sound detection is performed by a microphone array.

15. The method of claim 11, wherein the radar detecting is performed by a radar MMIC.

16. A voice assistant comprising:
   a radar;
   a microphone array; and
   a microprocessor coupled between the radar and microphone array, the microprocessor configured for directly processing specific command information from the microphone array when the specific command information is consistent with operator position information from the radar and, when the specific command information is not consistent with the operator position information from the radar, for processing the specific command information from the microphone array only after receiving global keyword information from the microphone array.

17. The voice assistant of claim 16, wherein the radar comprises a radar MMIC.

18. The voice assistant of claim 16, wherein the radar comprises an FMWC radar.

19. The voice assistant of claim 16, wherein microphone array comprises a beam forming microphone array.

20. The voice assistant of claim 16, further comprising an oscillator coupled to the radar.

\* \* \* \* \*